May 3, 1938. L. A. LEPPKE 2,115,862
SERVING DEVICE
Filed April 23, 1937 2 Sheets-Sheet 1
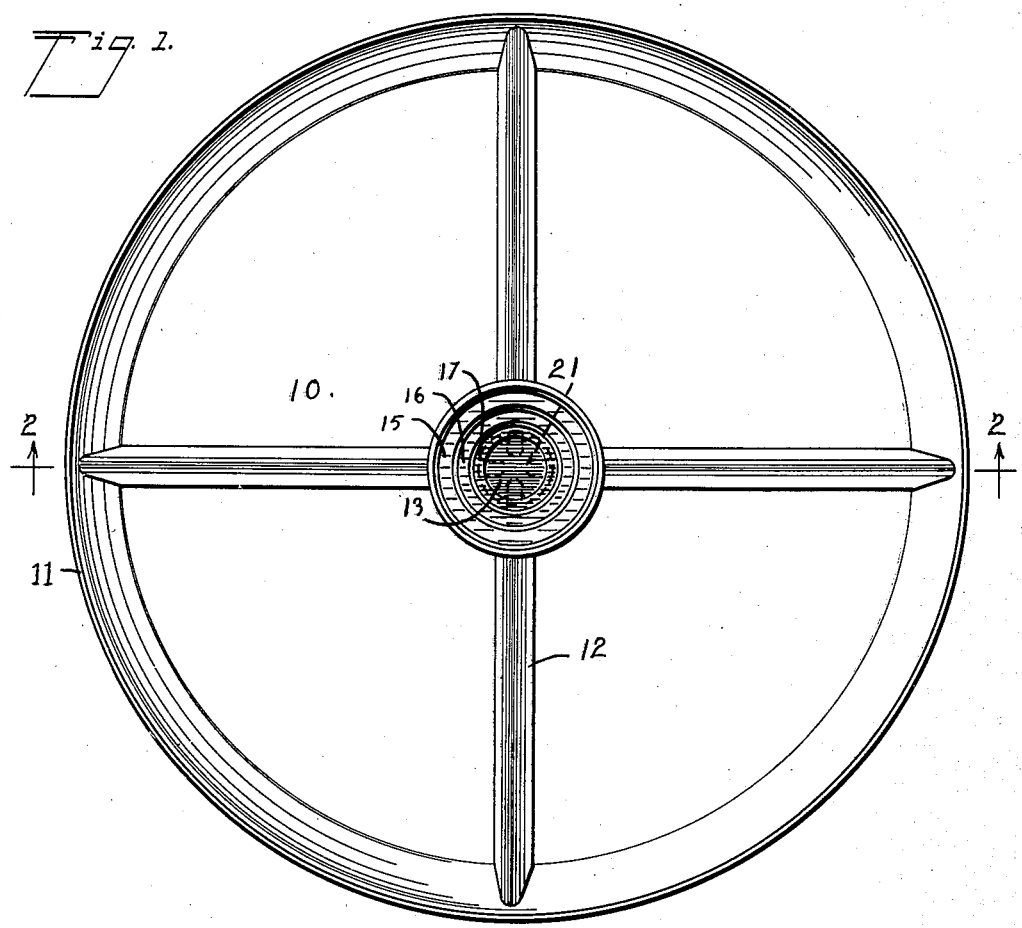
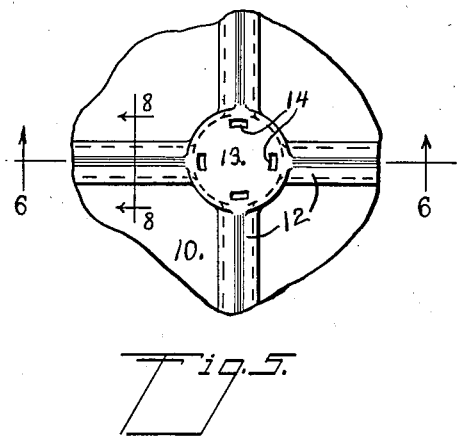
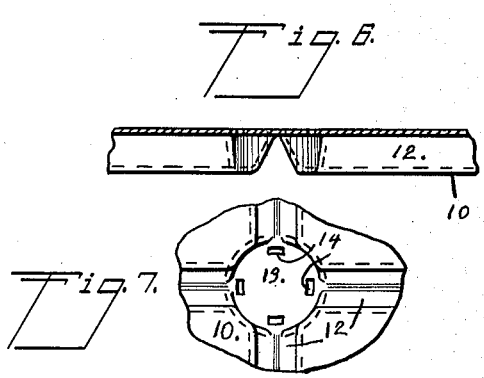
INVENTOR.
LOUIS A. LEPPKE.
BY John C. Baisch
ATTORNEY.

May 3, 1938.　　　L. A. LEPPKE　　　2,115,862
SERVING DEVICE
Filed April 23, 1937　　　2 Sheets-Sheet 2

INVENTOR.
LOUIS A. LEPPKE.
BY John C. Baisch
ATTORNEY.

Patented May 3, 1938

2,115,862

UNITED STATES PATENT OFFICE 2,115,862

SERVING DEVICE

Louis A. Leppke, Omaha, Nebr.

Application April 23, 1937, Serial No. 138,625

1 Claim. (Cl. 65—15)

This invention relates generally to serving devices and particularly to devices for serving lap lunches and for lunch service on speed trains, airplanes, cafeterias and the like.

In serving lunches on ordinary trays or plates, the cup or glass for the beverage served therewith is difficult to hold on such trays or plates and said cup or glass is likely to slip and slide about thereon and come into contact with the food on the tray thereby making the cup or glass messy and sticky to handle.

It is therefore an object of my invention to provide a serving device having means for holding a cup or glass or the like out of contact with the food on the tray.

It is another object of my invention to provide a device of this character that is convenient and compact in serving lunches thereon.

It is a further object of my invention to provide a device of this character constructed of metal, having two parts that may be stamped, said parts being secured together by simple clinching means.

Other objects of my invention are to provide a device of this character wherein cups or glasses of various sizes may be securely but removably held in the holding member, and wherein containers of various shapes may thus be held in said holding member.

A still further object of the invention is to provide a device of this character of simple and durable construction and of low manufacturing cost.

Numerous other objects and advantages of this invention will be apparent as it is better understood from the following detailed description, which, taken in connection with the accompanying drawings, discloses a preferred embodiment thereof.

Referring to the drawings:

Figure 1 is a plan view of my assembled serving device.

Figure 5 is a partial plan of the central portion of the tray member showing the seat for the holder member.

Figure 6 is a partial section of same, taken on line 6—6 of Figure 5.

Figure 7 is a view of the under side of same.

Figure 3:
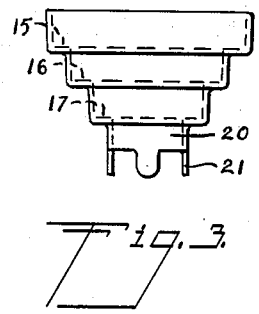
Figure 3 is an elevation of the holder member before same is secured to the plate or tray member.
Figure 8:
Figure 8 is an enlarged partial section taken on line 8—8 of Figure 5 showing a cross-section of one of the partitions or ribs of the tray member.
Figure 4:
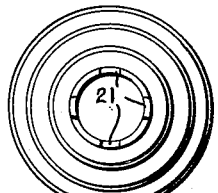
Figure 4 is a view of the under side of the same.

Referring more particularly to the drawings, which illustrate a preferred embodiment of my invention, the device comprises a tray 10 stamped from sheet metal. The tray has an upturned edge portion 11 and is provided with partitions or ribs 12 raised from the bottom of said tray 10 and formed integrally therewith. Adjacent the center of the tray is a raised horizontal holder seat 13 formed by stamping and being an integral part of the tray. The ribs 12 merge with the raised edge portion 11 at their outer ends and with the raised portion in the center of the tray at their inner ends, the entire plate member being an integral formation. Slots 14 are provided in the seat 13 adjacent the inner ends of the ribs 12, the purpose of said slots being explained below.

The holder member is also stamped out of metal, or may be drawn therefrom, and is hollow. Said holder member is provided with a series of stepped shoulders 15, 16 and 17 which form bases for flat bottomed glasses, the holder member being largest at the top for holding large sized glasses, as 18, Figure 2. Each lower shoulder is of smaller size respectively for holding smaller glasses, as 19, shown in dotted lines in Figure 2.

Depending from the inner edge of shoulder 17 is a tubular portion 20 adapted to rest on seat 13, and depending from the lower edge of tubular portion 20 are ears 21 arranged to be received in slots 14 in seat 13.

Figure 2:
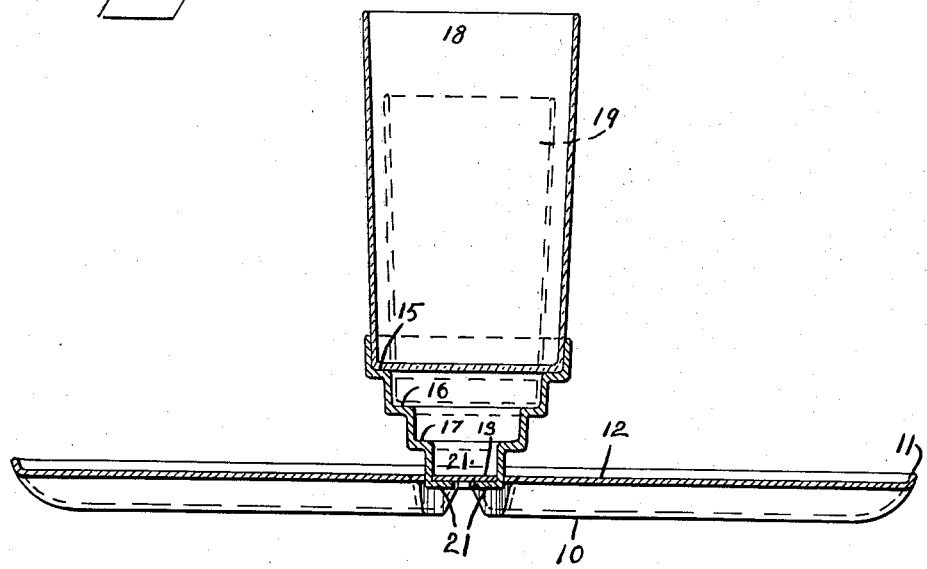
Figure 2 is a vertical section of same taken on line 2—2 of Figure 1 and including a glass received in the holder.

In assembling the device the holder is placed on seat 13 with the ears 21 projecting downwardly through the slots 14, said ears then being clinched or turned inwardly as shown in Figures 1 and 2 thereby securely fastening the plate and the holder member together.

A plane extending conically downward in the opening of the holder would touch the inner edges of the respective shoulders so that a conical or tapering beverage container may be removably received in said holder member.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

Having thus described my invention what I claim is:

In a serving device, a plate formed of a piece of metal and having an upturned edge portion, a horizontal, raised seat having a plurality of slots therein, radial ribs formed integrally with the plate and the raised seat, a holder member formed of a piece of metal, said holder member being hollow and having a plurality of shoulders stepped inwardly from the top and spaced vertically apart, a tubular portion depending from the inner edge of the lower shoulder and received on the seat, and a plurality of ears on the tubular portion received through the slots of the seat and turned inwardly against the under side of said seat.

LOUIS A. LEPPKE.